United States Patent
Army

(10) Patent No.: US 8,661,833 B2
(45) Date of Patent: Mar. 4, 2014

(54) BLEED VALVE MODULE

(75) Inventor: Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 512 days.

(21) Appl. No.: 13/006,849

(22) Filed: Jan. 14, 2011

(65) Prior Publication Data

US 2012/0180501 A1 Jul. 19, 2012

(51) Int. Cl.
*F02C 6/04* (2006.01)

(52) U.S. Cl.
USPC .................. 60/785; 60/782; 60/773; 60/793; 60/39.23; 60/796; 137/899.2

(58) Field of Classification Search
USPC ............................... 137/899.2; 258/560–635
See application file for complete search history.

(56) References Cited

U.S. PATENT DOCUMENTS

| | | | |
|---|---|---|---|
| 5,137,230 A | 8/1992 | Coffinberry | |
| 6,367,240 B1 * | 4/2002 | Hoyer et al. | 60/785 |
| 2009/0000305 A1 | 1/2009 | Porte et al. | |
| 2012/0045317 A1 * | 2/2012 | Saladino | 415/145 |

OTHER PUBLICATIONS

Army et al., U.S. Appl. No. 13/006,878, filed Jan. 14, 2011.

* cited by examiner

*Primary Examiner* — Phutthiwat Wongwian
*Assistant Examiner* — Craig Kim
(74) *Attorney, Agent, or Firm* — Kinney & Lange, P.A.

(57) ABSTRACT

A bleed valve module for mounting to a support structure within an aircraft includes a pipe, a plurality of bleed valves connected to the pipe, a plurality of pneumatic actuators connected to the plurality of bleed valves, and a vibration isolating element. The pipe contains a flow of bleed air and includes a plurality of inlets and an outlet. The plurality of bleed valves controls the flow of bleed air in the pipe. The plurality of pneumatic actuators actuate the plurality of bleed valves. The vibration isolating element connects the bleed valve module to the support structure within the aircraft and isolates the bleed valve module from vibration.

10 Claims, 4 Drawing Sheets

BLEED VALVE MODULE

BACKGROUND

The present invention relates to aircraft air management systems. In particular, the invention relates to bleed air systems for supplying compressed air to an aircraft air management system.

Aircraft air management systems supply bleed air to a variety of aircraft systems, such as an environmental control system to maintain aircraft cabin air pressures and temperatures within a target range for the safety and comfort of aircraft passengers, anti-icing systems, air-driven pumps, etc. This is done through the use of compressed air taken from two compressor stages (bleed air) of at least one of the bypass turbine engines propelling the aircraft. Each of the two air pressures available from the compressor (intermediate pressure (IP) and high pressure (HP)) are directed to the air management system through pressure lines or plenums. A pneumatic valve controller operates a series of pneumatically operated bleed valves in response to electronic control signals from the air management system to control the relative flows of IP and HP compressed air flowing to the air management system. Air pressure in the pressure lines is measured by at least one pressure sensor which provides this information to air management system. The air management system uses the air pressure information along with other information from around the aircraft to direct the pneumatic valve controller to provide the desired bleed air flow to the air management system.

The bleed valves, pressure sensor, and pneumatic valve controller are exposed to extreme conditions. These components operate near the compressor of the bypass turbine engine, in an environment of extreme vibration. In addition, the compressed air is extremely hot, in excess of 600 degrees Fahrenheit. This extreme heat and vibration are major factors leading to failure of these components.

SUMMARY

The present invention concerns a bleed valve module for mounting to a support structure within an aircraft. The module includes a pipe, a plurality of bleed valves connected to the pipe, a plurality of pneumatic actuators connected to the plurality of bleed valves, and a vibration isolating element. The pipe contains a flow of bleed air and includes a plurality of inlets and an outlet. The plurality of bleed valves controls the flow of bleed air in the pipe. The plurality of pneumatic actuators actuate the plurality of bleed valves. The vibration isolating element connects the bleed valve module to the support structure within the aircraft to isolate the bleed valve module from vibration from the support structure.

DETAILED DESCRIPTION

Conventional implementations of bleed valves, bleed air system sensors and pneumatic valve controllers to provide bleed air for aircraft air management systems leave these components susceptible to damage from vibration and high temperatures. The present invention includes a vibration-isolated bleed valve module to isolate bleed valves from harmful vibration effects. In addition, by positioning the bleed valve module near a fan air plenum, the present invention protects temperature-sensitive electrical control elements, such as torque motors and pressure sensors, with a cooling flow of fan air. By reducing the effects of heat and vibration, the reliability and lifespan of the bleed valve control system components is enhanced. The present invention also permits locating temperature-sensitive electrical control elements, including valve position sensors, close to the bleed valves. This provides for closely coupled feedback monitoring of the bleed valve positions, providing better control with reduced control oscillations. Reducing control oscillations further enhances component reliability and lifetime by reducing the use of the bleed valves, which reduces the wear on the bleed valves.

Figure 1:
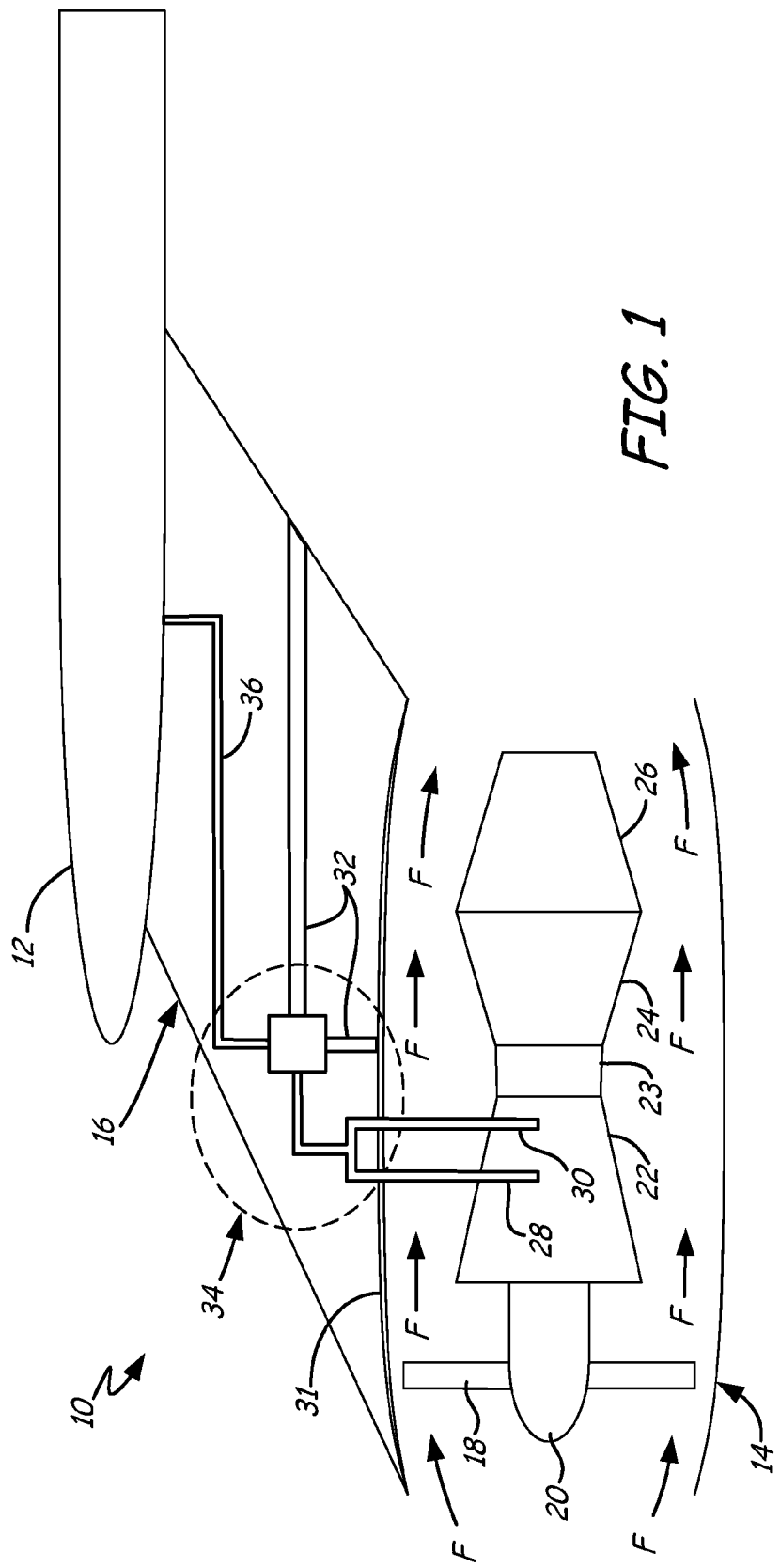
FIG. 1 is a side schematic view of a bypass turbine engine and pylon incorporating a bleed valve control system of the present invention.

FIG. 1 is a side schematic view of a bypass turbine engine and pylon incorporating a bleed valve control system of the present invention. FIG. 1 shows aircraft propulsion system 10 attached to aircraft wing 12 and includes bypass turbine engine 14 and pylon 16. Bypass turbine engine 14 includes fan 18, turbine engine shaft 20, compressor 22, combustor 23, turbine 24, exhaust nozzle 26, intermediate pressure bleed air line 28, high pressure bleed air line 30 and engine mount beam 31. Pylon 16 includes fan air plenum 32, bleed air conditioning system 34, and cooled bleed air line 36.

Pylon 16 connects bypass turbine engine 14 at engine mount beam 31 to wing 12. Compressor 22 connects fan 18 and combustor 23. Combustor 23 connects compressor 22 and turbine 24. Exhaust nozzle 26 is attached to turbine 24. Turbine engine shaft 20 is connected to fan 18, compressor 22, and turbine 24. Intermediate pressure bleed air line 28 and high pressure bleed air line 30 are attached to stages of compressor 22 providing air of intermediate pressure and high pressure, respectively. Intermediate pressure bleed air line 28 and high pressure bleed air line 30 are also attached to bleed air conditioning system 34 in pylon 16. Fan air plenum 32 is a rigid-walled duct and extends from bypass turbine engine 14, through engine mount beam 31, bleed air conditioning system 34, and out pylon 16. Cooled bleed air line 36 extends from bleed air conditioning system 34 through pylon 16 to wing 12 and on to the variety of aircraft systems for which the aircraft air management system supplies bleed air (not shown).

In operation, air is compressed in stages by compressor 22 and ignited with fuel in combustor 23 to produce rapidly expanding gasses that drive rotation in turbine 24. The expanding gasses exit exhaust nozzle 26 providing a portion of the engine thrust. Turbine 24 rotates attached turbine engine shaft, providing power for the compression of air in compressor 22 and for the rotation of fan 18. Fan 18 rotates to provide a flow of fan air (F) through bypass turbine engine 14. The flow of fan air exiting bypass turbine engine 14 near nozzle 26 provides the balance of the engine thrust. A portion of the fan air flows into fan air plenum 32 for use by bleed air conditioning system 34. Intermediate pressure bleed air line 28 and high pressure bleed air line 30 direct air from the intermediate pressure and high pressure stages, respectively, of compressor 22 to bleed air conditioning system 34. Bleed air conditioning system 34 uses intermediate pressure bleed air provided by intermediate pressure bleed air line 28, high pressure bleed air provided by high pressure bleed air line 30, and fan air flow provided by fan air plenum 32 to deliver cooled bleed air to the air management system through cooled bleed air line 36 at a temperature and pressure required by the air management system to supply bleed air to a variety of aircraft systems.

Figure 2:
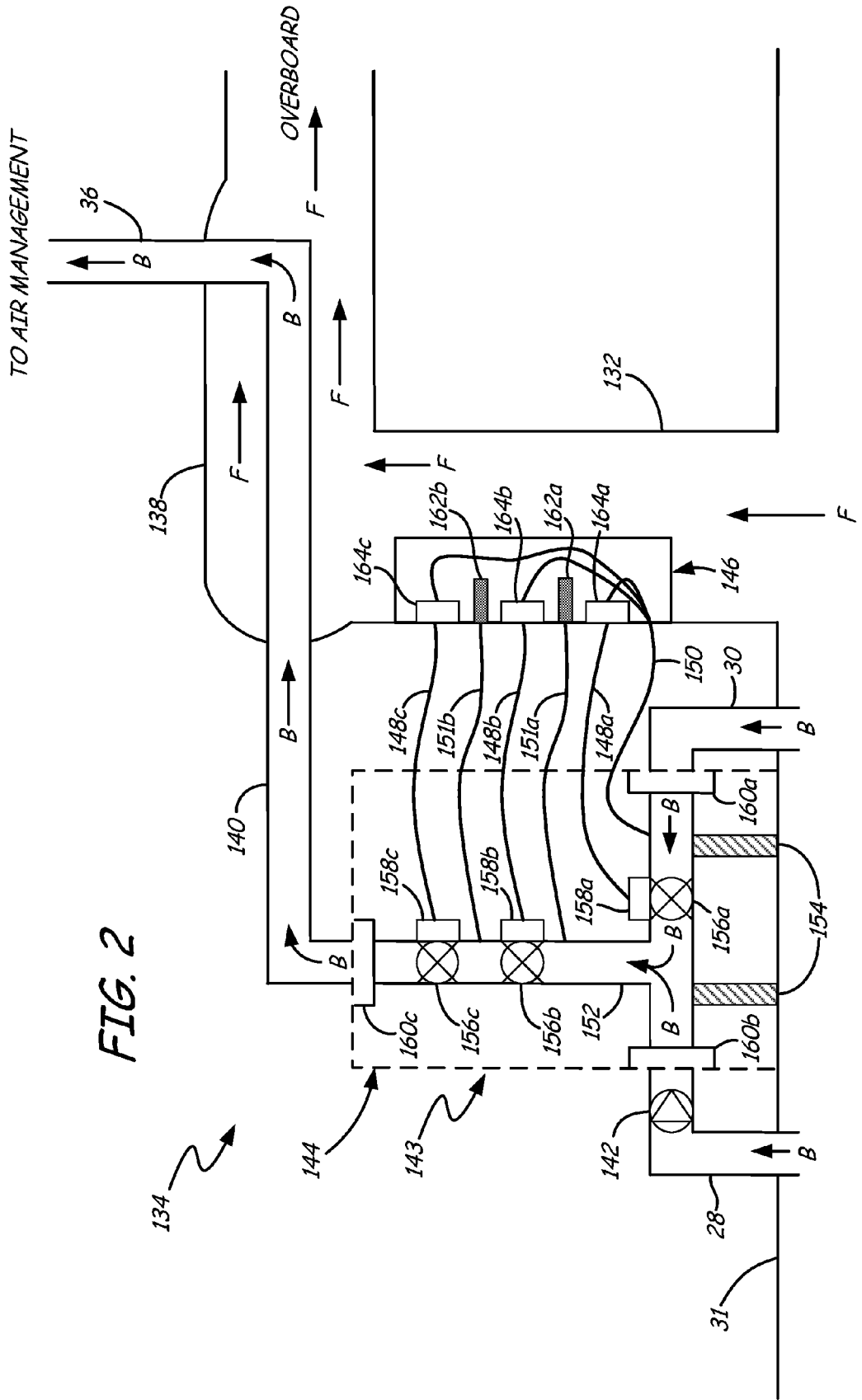
FIG. 2 is a more detailed side schematic view of a portion of the bypass turbine engine and pylon of FIG. 1 illustrating an embodiment of a bleed valve control system of the present invention.

FIG. 2 is a more detailed side schematic view of a portion of the bypass turbine engine and pylon of FIG. 1 illustrating an embodiment of a bleed valve control system of the present invention. FIG. 2 shows bleed air conditioning system 134 including fan air plenum 132, precooler 138, un-cooled bleed air line 140, intermediate pressure check valve 142, and bleed valve control system 143. Bleed valve control system 143 includes bleed valve module 144, pneumatic valve controller 146, pneumatic control lines 148a-148c, pneumatic supply line 150, and bleed air pressure impulse lines 151a-151b. Bleed valve module 144 includes pipe 152, vibration isolating element 154 (two shown), first bleed valve 156a, second bleed valve 156b, and third bleed valve 156c, pneumatic actuators 158a-158c, first bleed valve module inlet 160a, second bleed valve module inlet 160b, and bleed valve module outlet 160c. Pneumatic valve controller 146 includes bleed air pressure sensors 162a-162b and torque motors 164a-164c.

Pipe 152 of bleed valve module 144 connects to high pressure bleed air line 30 at bleed valve module connection 160a, intermediate pressure bleed air line 28 at bleed valve module connection 160b, and un-cooled bleed air line 140 at bleed valve module connection 160c. Intermediate pressure check valve 142 is connected to bleed air line 28. Precooler 138 connects un-cooled bleed air line 140 to cooled bleed air line 36. Precooler 138 is an air-to-air heat exchanger connected to fan air plenum 132 such that there is efficient heat transfer between the bleed air flow through precooler 138 and the fan air flow (F) through precooler 138, without mixing of the bleed air flow and the fan air flow. Fan air plenum 132 is a rigid-walled duct and extends from bypass turbine engine 14, through engine mount beam 31, bleed air conditioning system 134, and out pylon 16.

Vibration isolating elements 154 connect bleed valve module 144 to a support structure, for example, engine mount beam 31 as illustrated in FIG. 2, an internal structural framework (not shown) within pylon 16, or a mechanical support (not shown) for a rigid-walled duct, for example, fan air plenum 132. Bleed valves 156a-156c are connected to pipe 152 such that bleed valve 156a (High Pressure Valve) controls the flow of bleed air (B) from high pressure bleed air line 30 into pipe 152, bleed valve 156b (Pressure Regulating Valve) controls the flow of bleed air through pipe 152 to un-cooled bleed air line 140, and bleed valve 156c (Overpressure Valve) provides overpressure control between bleed valve 156b and un-cooled bleed air line 140. Pneumatic actuators 158a-158c are attached to bleed valves 156a-156c to actuate bleed valves 156a-156c.

Fan air plenum 132 is as described in reference to FIG. 1 for fan air plenum 32, but with the additional feature that pneumatic valve controller 146 is located within fan air plenum 132. Pneumatic control lines 148a-148c connect torque motors 164a-164c of pneumatic valve controller 146 to pneumatic actuators 158a-158c. Pneumatic supply line 150 connects pneumatic valve controller 146 to a supply of pressurized air, for example, pipe 152 between bleed valve 156a and bleed valve module connection 160a, which supplies high pressure air. The use of high pressure air permits the use of smaller pneumatic actuators 158a-158c. If desired for compatibility with torque motors 164a-164c, the supply of pressurized air may be cooled by a heat exchanger cooled by a fan air flow (not shown). Bleed air pressure impulse lines 151a-151b connect bleed air pressure sensors 162a-162b to pipe 152 such that bleed air pressure sensor 162a (High Stage Pressure Sensor) senses pressure in pipe 152 between bleed valve 156a and bleed valve 156b, and bleed air pressure sensor 162b (Manifold Pressure Sensor) senses pressure in pipe 152 between bleed valve 156b and bleed valve 156c. Torque motors 164a-164c and bleed air pressure sensors 162a-162b are electrically connected to a bleed system controller (not shown).

In operation, bleed air conditioning system 134 supplies cooled bleed air at a desired pressure in response to electronic control signals from the bleed system controller directed to torque motors 164a-164c of pneumatic valve controller 146. Torque motors 164a-164c permit a portion of supply air from pneumatic supply line 150 to pressurize pneumatic control lines 148a-148c sufficiently to cause pneumatic actuators 158a-158c to open or close bleed valves 156a-156c as needed to achieve the bleed air pressure required by the air management system. For example, when bleed air is desired at pressures less than that of intermediate pressure bleed air line 28, torque motor 164a modulates the supply air from pneumatic supply line 150 to pressurize pneumatic control line 148a such that pneumatic actuator 158a closes bleed valve 156a, preventing high pressure air from flowing through bleed valve module 144. Bleed air pressure is provided by intermediate pressure bleed air line 28 and controlled by modulating bleed valve 156b by torque motor 164b via pneumatic control line 148b and pneumatic actuator 158b. When bleed air pressures required by the bleed system controller exceed the air pressure available from intermediate pressure bleed air line 28, electronic control signals are sent to torque motor 164a to modulate the supply air to pneumatic actuator 158a via pneumatic control line 148a to open bleed valve 156a. Opening pressure bleed valve 156a produces pressure in pipe 152 that is higher than that in intermediate pressure bleed air line 28, causing intermediate pressure check valve 142 to close. Bleed air pressure is provided by high pressure bleed line 30 and controlled by modulating bleed valve 156b by torque motor 164b via pneumatic control line 148b and pneumatic actuator 158b. Should a failure in occur in the operation of bleed valves 156a-156b, the bleed system controller signals torque motor 164c to modulate the supply air to pneumatic actuator 158c via pneumatic control line 148c to close bleed valve 156c and protect systems downstream of bleed valve module 144. Bleed air pressure sensors 162a-162b provide bleed air pressure information to the bleed system controller such that the bleed system controller can determine the electronic control signals to send to torque motors 164a-164c to achieve the desired bleed air pressure from bleed air conditioning system 134.

Un-cooled bleed air flows from bleed valve module 144 into un-cooled bleed air line 140 and into precooler 138. The bleed air is cooled as it flows through precooler 138 by heat transfer to fan air also flowing through precooler 138. The heat transfer is by conduction through a heat exchange surface of relatively large area, and by convection to and from the heat exchange surface by the bleed air flow and the fan air flow, respectively. At no point in precooler 138 do the bleed air and fan air flows mix. The cooled bleed air flows from precooler 138 into cooled bleed air line 36 and on to the variety of aircraft systems for which the aircraft air management system supplies bleed air (not shown).

As noted above, bleed valves 156a-156c and pneumatic actuators 158a-158c are all attached to pipe 152 of bleed valve module 144. A plurality of vibration isolating elements 154 connect bleed valve module 144 to a support structure, as described above, to isolate pipe 152 and all components connected to pipe 152 from vibration. This vibration isolation serves to enhance the reliability of the components connected to pipe 152. Vibration isolating element 154 is any type of vibration isolating device, for example, an elastomeric material, damped spring, or a magneto-rheological fluid.

The modular nature of bleed valve module 144 also permits fast efficient replacement of bleed valves 156a-156c and pneumatic actuators 158a-158c all at one time. Bleed valve module 144 can be removed and a new bleed valve module 144 installed quickly to help minimize aircraft downtime. This modularity also permits fast and efficient replacement of individual bleed valves 156a-156c and pneumatic actuators 158a-158c once bleed valve module 144 is removed.

Reliability of pneumatic valve controller 146 is enhanced by the cooling provided from the flow of fan air past pneumatic valve controller 146 within fan air plenum 132. Temperature-sensitive electrical control elements, such as torque motors 164a-164c and bleed air pressure sensors 162a-162c, within pneumatic valve controller 146 are cooled, thereby enhancing their reliability. The performance of pneumatically controlled systems degrades with longer pneumatic control line lengths. By locating bleed valve module 144 proximate fan air plenum 132, pneumatic valve controller 146 is located within fan air plenum 132 while keeping pneumatic control lines 148a-148c relatively short.

The embodiment describe in reference to FIG. 2 enhances the reliability of bleed valves 156a-156c and pneumatic actuators 158a-158c by isolating these components from harmful vibration effects. In addition, by positioning bleed valve module 144 near fan air plenum 132, this embodiment protects temperature-sensitive electrical control elements, such as torque motors 164a-164c and bleed air pressure sensors 162a-162c, with a cooling flow of fan air. By reducing the effects of heat and vibration, the embodiment of FIG. 2 enhances the reliability and lifespan of the bleed valve control system components. Finally, the modular design of bleed valve module 144 enhances serviceability to help minimize aircraft downtime.

Figure 3:
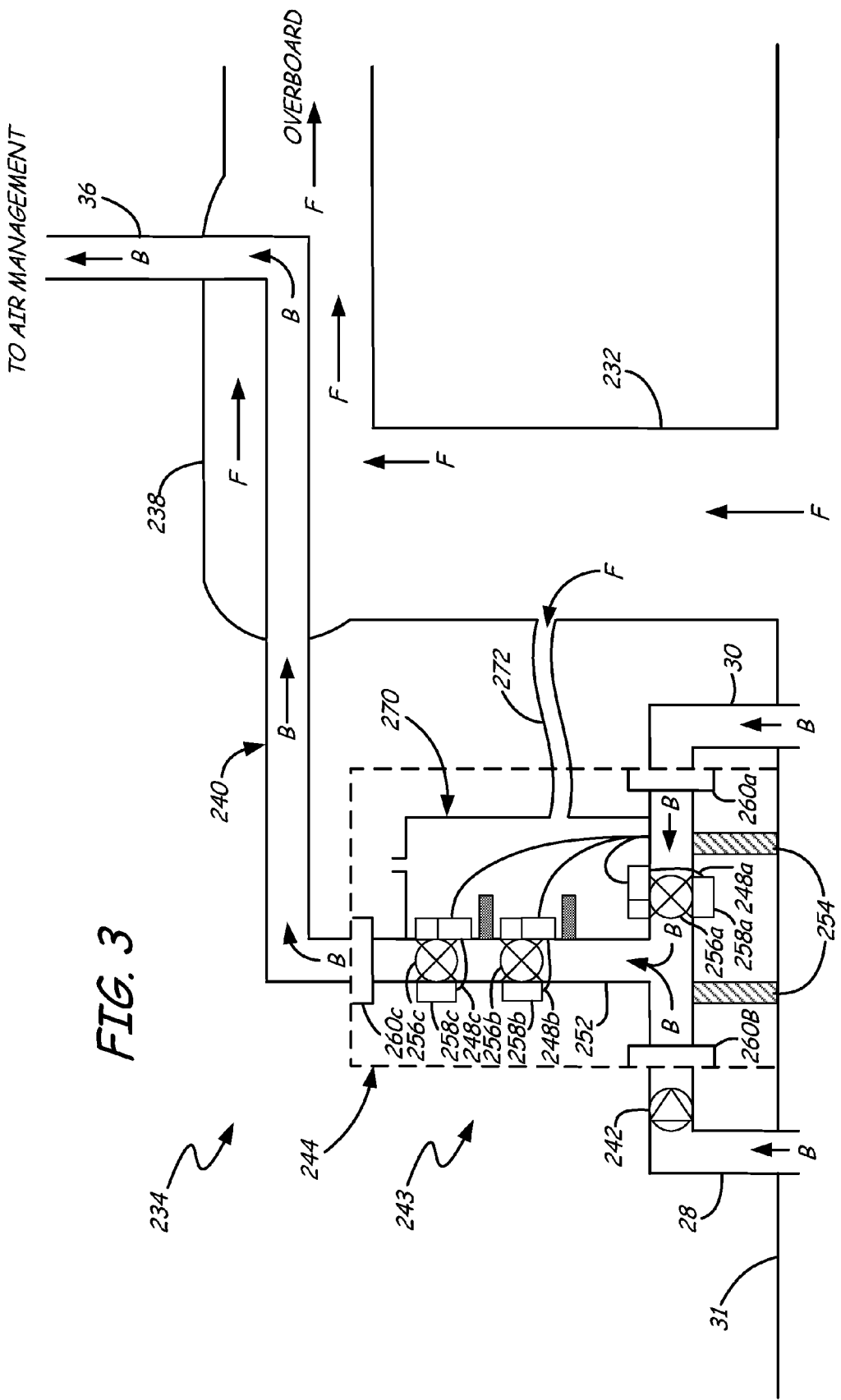
FIG. 3 is a more detailed side schematic view of a portion of the bypass turbine engine and pylon of FIG. 1 illustrating another embodiment of a bleed valve control system of the present invention.
Figure 4:
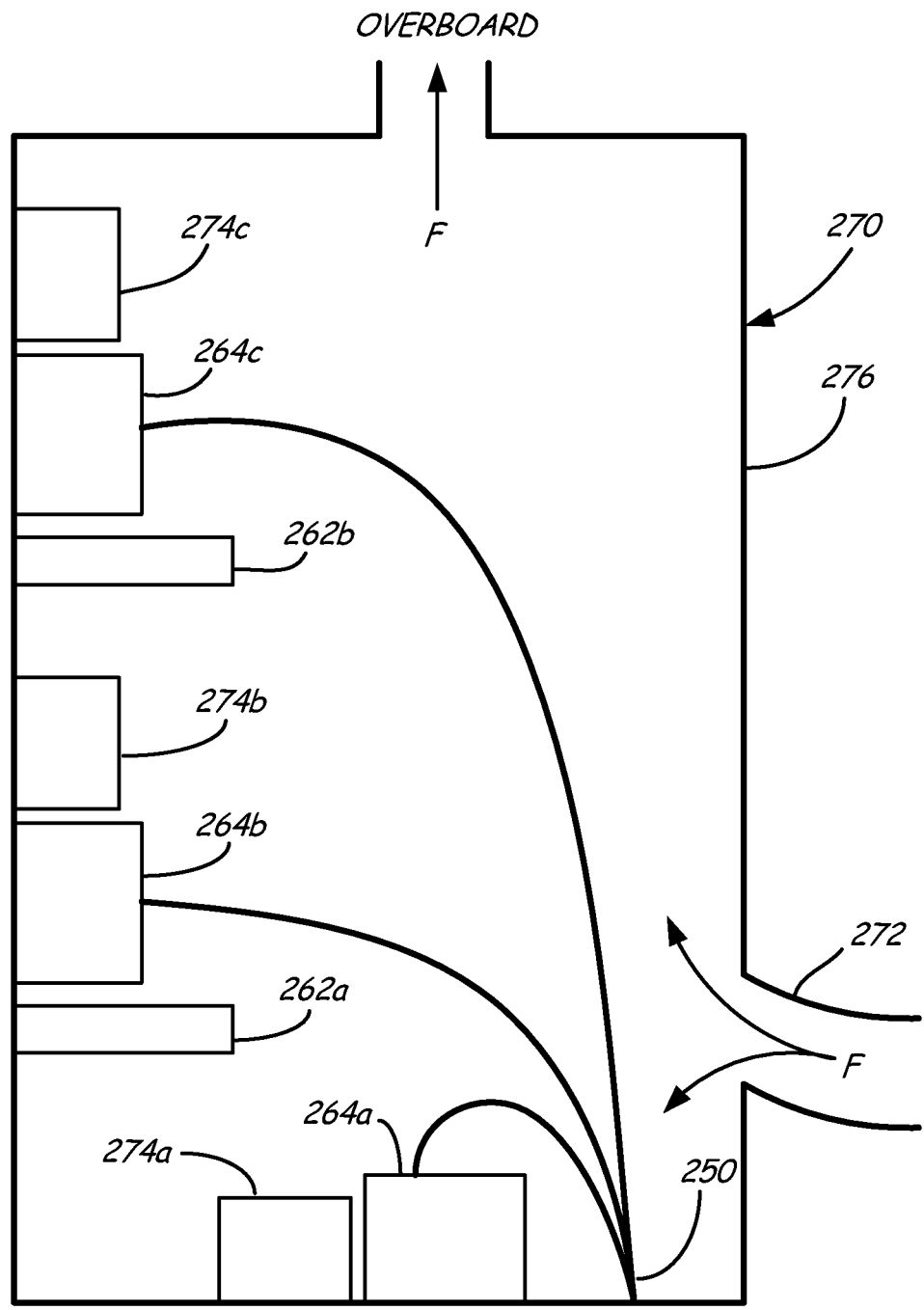
FIG. 4 is a more detailed side schematic view of a portion of the bleed valve control system of FIG. 3.

FIG. 3 is a more detailed side schematic view of a portion of the bypass turbine engine and pylon of FIG. 1 illustrating another embodiment of a bleed valve control system of the present invention. FIG. 3 shows bleed air conditioning system 234 including fan air plenum 232, precooler 238, un-cooled bleed air line 240, intermediate pressure check valve 242, and bleed valve control system 243. Bleed valve control system 243 includes bleed valve module 244, pneumatic control lines 248a-248c, pneumatic valve controller 270, and fan air duct 272. Bleed valve module 244 includes pipe 252, vibration isolating element 254 (two shown), bleed valves 256a-256c, pneumatic actuators 258a-258c, and bleed valve module connections 260a-260c. FIG. 4 is a more detailed side schematic view of pneumatic valve controller 270 of bleed valve control system 243 of FIG. 3. As shown in FIG. 4, pneumatic valve controller 270 includes bleed air pressure sensors 262a-262b, torque motors 264a-264c, pneumatic supply line 250, valve position sensors 274a-274c, and cooling shroud 276. Valve position sensors 274a-274c are any type of electro-mechanical sensor for detecting a change in position of an object, for example, a rotary variable differential transformer or a linear variable differential transformer. Bleed air pressure sensors 262a-262b, torque motors 264a-264c, and valve position sensors 274a-274c are electrical control elements. Electrical control elements are the components of bleed valve control system 243 most susceptible to failure due to prolonged exposure to high temperatures.

Considering FIG. 3 and FIG. 4 together, pipe 252 of bleed valve module 244 connects to high pressure bleed air line 30 at bleed valve module connection 260a, intermediate pressure bleed air line 28 at bleed valve module connection 260b, and un-cooled bleed air line 240 at bleed valve module connection 260c. Intermediate pressure check valve 242 is connected to bleed air line 28. Precooler 238 connects un-cooled bleed air line 240 to cooled bleed air line 36. Precooler 238 is an air-to-air heat exchanger connected to fan air plenum 232 such that there is efficient heat transfer between the bleed air flow through precooler 238 and the fan air flow (F) through precooler 238, without mixing of the bleed air flow and the fan air flow. Fan air plenum 232 is a rigid-walled duct and extends from bypass turbine engine 14, through engine mount beam 31, bleed air conditioning system 234, and out pylon 16.

Vibration isolating elements 254 connect bleed valve module 244 to a support structure, for example, engine mount beam 31 as illustrated in FIG. 3, an internal structural framework (not shown) within pylon 16, or a mechanical support (not shown) for a rigid-walled duct, for example, fan air plenum 232. Bleed valves 256a-256c are connected to pipe 252 such that bleed valve 256a (High Pressure Valve) controls the flow of bleed air (B) from high pressure bleed air line 30 into pipe 252, bleed valve 256b (Pressure Regulating Valve) controls the flow of bleed air through pipe 252 to un-cooled bleed air line 240, and bleed valve 256c (Overpressure Valve) provides overpressure control between bleed valve 256b and un-cooled bleed air line 240. Pneumatic actuators 258a-258c are attached to bleed valves 256a-256c to actuate bleed valves 256a-256c.

Pneumatic control lines 248a-248c connect torque motors 264a-264c of pneumatic valve controller 270 to pneumatic actuators 258a-258c. Pneumatic supply line 250 connects torque motors 264a-264c within pneumatic valve controller 270 to a supply of pressurized air. Pneumatic supply line 250 may connect to a single pressurized air supply point, e.g., pipe 252 between bleed valve 256a and bleed valve module connection 260a, which supplies high pressure air, as shown in FIG. 4. The use of high pressure air permits the use of smaller pneumatic actuators 258a-258c. Alternatively, pneumatic supply line 250 may connect to multiple pressurized air supply points, e.g., the housing of bleed valve 256a to supply pressurized air to bleed valve 256a, the housing of bleed valve 256b to supply pressurized air to bleed valve 256b, and the housing of bleed valve 256c to supply pressurized air to bleed valve 256c. If desired for compatibility with torque motors 264a-264c, the supply of pressurized air may be cooled by a heat exchanger cooled by a fan air flow (not shown). Bleed air pressure sensors 262a-262b are connected to pipe 252 such that bleed air pressure sensor 262a (High Stage Pressure Sensor) senses pressure in pipe 252 between bleed valve 256a and bleed valve 256b, and bleed air pressure sensor 262b (Manifold Pressure Sensor) senses pressure in pipe 252 between bleed valve 256b and bleed valve 256c. Valve position sensors 274a-274c connect to corresponding bleed valves 256a-256c to measure the positions of bleed valves 256a-256c. Torque motors 264a-264c, bleed air pressure sensors 262a-262b, and valve position sensors 274a-274c are electrically connected to a bleed system controller (not shown).

Fan air plenum 232 is as described in reference to FIG. 1 for fan air plenum 32, but with the additional feature of fan air duct 272 to connect fan air plenum 232 to cooling shroud 276. Cooling shroud 276 is connected to pipe 252 and at least partially surrounds the temperature-sensitive electrical control elements of pneumatic valve controller 270, including torque motors 264a-264c, bleed air pressure sensors 262a-262b, and valve position sensors 274a-274c.

In operation, bleed air conditioning system 234 supplies cooled bleed air at a desired pressure in response to electronic control signals from the bleed system controller directed to torque motors 264a-264c of pneumatic valve controller 270. Torque motors 264a-264c permit a portion of supply air from pneumatic supply line 250 to pressurize pneumatic control lines 248a-248c sufficiently to cause pneumatic actuators 258a-258c to open or close bleed valves 256a-256c as needed to achieve the bleed air pressure required by the air management system. For example, when bleed air is desired at pressures less than that of intermediate pressure bleed air line 28, torque motor 264a modulates the supply air from pneumatic supply line 250 to pressurize pneumatic control line 248a such that pneumatic actuator 258a closes bleed valve 256a, preventing high pressure air from flowing through bleed valve module 244. Bleed air pressure is provided by intermediate pressure bleed air line 28 and controlled by modulating bleed valve 256b by torque motor 264b via pneumatic control line 248b and pneumatic actuator 258b. When bleed air pressures required by the bleed system controller exceed the air pressure available from intermediate pressure bleed air line 28, electronic control signals are sent to torque motor 264a to modulate the supply air to pneumatic actuator 258a via pneumatic control line 248a to begin opening bleed valve 256a. Opening pressure bleed valve 256a produces pressure in pipe 252 that is higher than that in intermediate pressure bleed air line 28, causing intermediate pressure check valve 242 to close. Bleed air pressure is provided by high pressure bleed line 30 and controlled by modulating bleed valve 256b by torque motor 264b via pneumatic control line 248b and pneumatic actuator 258b. Should a failure in occur in the operation of bleed valves 256a-256b, the bleed system controller signals torque motor 264c to modulate the supply air to pneumatic actuator 258c via pneumatic control line 248c to close bleed valve 256c and protect systems downstream of bleed valve module 244.

Un-cooled bleed air flows from bleed valve module 244 into un-cooled bleed air line 240 and into precooler 238. The bleed air is cooled as it flows through precooler 238 by heat transfer to fan air also flowing through precooler 238. The heat transfer is by conduction through a heat exchange surface of relatively large area, and by convection to and from the heat exchange surface by the bleed air flow and the fan air flow, respectively. At no point in precooler 238 do the bleed air and fan air flows mix. The cooled bleed air flows from precooler 238 into cooled bleed air line 36 and on to the variety of aircraft systems for which the aircraft air management system supplies bleed air (not shown).

Bleed air pressure sensors 262a-262b provide bleed air pressure information to the bleed system controller such that the bleed system controller can determine the electronic control signals to send to torque motors 264a-264c to achieve the desired bleed air pressure from bleed air conditioning system 234. Valve position sensors 274a-274c directly measure the positions of bleed valves 256a-256c to provide valve position information to the bleed system controller such that the bleed system controller can more quickly and accurately adjust torque motors 264a-264c to produce the desired bleed air pressure. By closely coupling the feedback control information provided by valve position sensors 274a-274c with the accurate adjustment of torque motors 264a-264c, the bleed system controller provides better control with reduced control oscillations. Reducing control oscillations further enhances component reliability and lifetime by reducing the adjustments required of bleed valves 256a-256c, which reduces wear on bleed valves 256a-256c.

The temperature-sensitive electrical control elements of pneumatic valve controller 270, including torque motors 264a-264c, bleed air pressure sensors 262a-262b, and valve position sensors 274a-274c, are protected from the extreme temperatures that are present in the vicinity of bleed valve module 244 by cooling shroud 276. Cool fan air (F) flows from fan air plenum 232 into fan air duct 272 and into cooling shroud 276. As the cool fan air circulates within cooling shroud 276, heat is transferred from torque motors 264a-264c, bleed air pressure sensors 262a-262b, and valve position sensors 274a-274c by convective heat transfer into the cool fan air flow. Fan air flow out of cooling shroud 276 and expelled outside of the aircraft, carrying the transferred heat overboard.

As noted above, bleed valves 256a-256c and pneumatic actuators 258a-258c are all attached to pipe 252 of bleed valve module 244. A plurality of vibration isolating elements 254 connect bleed valve module 244 to a support structure, as described above, to isolate pipe 252 and all components connected to pipe 252 from vibration. This vibration isolation serves to enhance the reliability of the components connected to pipe 252. Vibration isolating element 254 is any type of vibration isolating device, for example, an elastomeric material, damped spring, or a magneto-rheological fluid.

The embodiment described in reference to FIGS. 3 and 4 has all of the advantages of the embodiment described above in reference to FIG. 2, including the modular nature of bleed valve module 244 which permits fast and efficient servicing of bleed valve module 244 to help minimize aircraft downtime and the vibration isolation of bleed valves 256a-256c and pneumatic actuators 258a-258c from harmful vibration effects. The embodiment of FIGS. 3 and 4 also has the advantage of positioning pneumatic valve controller 270 adjacent to bleed valve module 244 such that the temperature-sensitive electrical control elements of pneumatic valve controller 270 are closely connected to the bleed valve module 244, providing many performance and reliability enhancements. This is made possible by at least partially surrounding the temperature-sensitive electrical control elements by cooling shroud 276 and directing cool fan air through cooling shroud 276. By positioning torque motors 264a-264c close to pneumatic actuators 258a-258c, pneumatic control lines 248a-248c are even shorter than the embodiment of FIG. 2, further reducing the performance degradation associated with longer pneumatic control line lengths. Valve position sensors 274a-274c can be employed close to bleed valves 256a-256c, providing closely coupled feedback to the bleed system controller, thereby reducing control oscillations and the corresponding wear on bleed valves 256a-256c, in addition to providing more precise valve position control. Finally, locating bleed air pressure sensors 262a-262b close to bleed valve module 244 eliminates the need for pressure impulse lines to transmit pressure within pipe 252 to bleed air pressure sensors 262a-262b, increasing the responsiveness and accuracy of the bleed air pressure information sent to the bleed system controller.

The above embodiments are illustrated with two pressure sensors, a high stage pressure sensor and a manifold pressure sensor. It is understood that the invention encompasses embodiments with only a manifold pressure sensor. For ease of illustration, all valves, actuators, and sensors in the above embodiments are depicted as identical to each other, but it is understood that the invention encompasses embodiments in which varieties of valve types, actuator types and sensor types are employed. For example, an overpressure valve may be of the type that fails closed and a pressure regulating valve and a high pressure valve may be of the type that fails open.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bleed valve module for mounting to a support structure within an aircraft, the module comprising:
   a pipe for containing a flow of bleed air, the pipe comprising a plurality of inlets and an outlet;
   a plurality of bleed valves connected to the pipe to control the flow of bleed air in the pipe;
   a plurality of pneumatic actuators connected to the plurality of bleed valves to actuate the plurality of bleed valves; and
   a vibration isolating element to connect the bleed valve module to the support structure within the aircraft and isolate the bleed valve module from vibration from the support structure, wherein the vibration isolating element is at least one of an elastomeric material, damped spring, and a magneto-rheological fluid.

2. The bleed valve module of claim 1, wherein the support structure within the aircraft is within an engine pylon.

3. The bleed valve module of claim 1, wherein the support structure is at least one of an engine mount beam, an internal structural framework within a pylon, or a mechanical support for a rigid-walled duct.

4. The bleed valve module of claim 1, wherein bleed air at a first pressure enters the pipe at a first inlet and bleed air at a second pressure enters the pipe at a second inlet, the first pressure being greater than the second pressure.

5. The bleed valve module of claim 4, wherein a supply pressure for the plurality of pneumatic actuators is at the first pressure.

6. The bleed valve module of claim 4, wherein the plurality of bleed valves comprises:
   a first bleed valve connected to the pipe between the first inlet and the second inlet and between the first inlet and the outlet;
   a second bleed valve connected to the pipe between the outlet and the second inlet and between the outlet and the first bleed valve; and
   a third bleed valve connected to the pipe between the second bleed valve and the outlet.

7. The bleed valve module of claim 6, wherein the plurality of pneumatic actuators comprises:
   a first pneumatic actuator connected to the first bleed valve;
   a second pneumatic actuator connected to the second bleed valve; and
   a third pneumatic actuator connected to the third bleed valve.

8. A method for installing a bleed valve module for mounting to a support structure within an aircraft, the method comprising the steps of:
   connecting a plurality of bleed valve module inlets to a plurality of compressor bleed air lines;
   connecting a bleed valve module outlet to an un-cooled bleed air line;
   connecting a plurality of bleed valve module pneumatic actuators to a plurality of pneumatic control lines; and
   installing a vibration isolating element between the bleed valve module and the support structure to connect the bleed valve module to the support structure and isolate the bleed valve module from vibration from the support structure, wherein the vibration isolating element is at least one of an elastomeric material, damped spring, and a magneto-rheological fluid.

9. The method of claim 8, wherein connecting a plurality of bleed valve module inlets to a plurality of compressor bleed air lines comprises the steps of:
   connecting a first inlet to a compressor bleed air line at a first pressure; and
   connecting a second inlet to a compressor bleed air line at a second pressure, wherein the first pressure is greater than the second pressure.

10. The method of claim 8, wherein connecting a plurality of bleed valve module pneumatic actuators to a plurality of pneumatic control lines comprises the steps of:
   connecting a first pneumatic control line to a first pneumatic actuator;
   connecting a second pneumatic control line to a second pneumatic actuator; and
   connecting a third pneumatic control line to a third pneumatic actuator.

* * * * *